United States Patent [19]
Stuart

[11] 3,739,635
[45] June 19, 1973

[54] FUEL MANAGEMENT SYSTEM

[75] Inventor: Douglas E. Stuart, Middlebury, Vt.

[73] Assignee: Simmonds Precision Products, Inc., Tarrytown, N.Y.

[22] Filed: May 12, 1971

[21] Appl. No.: 142,525

[52] U.S. Cl. .............................. 73/194 M, 73/195
[51] Int. Cl. ............................ G01f 1/02, G01f 9/00
[58] Field of Search ................. 73/194 M, 195, 196

[56] References Cited
UNITED STATES PATENTS

| | | | |
|---|---|---|---|
| 2,981,105 | 4/1961 | Ryder | 73/304 |
| 3,050,999 | 8/1962 | Edwards | 73/304 |

FOREIGN PATENTS OR APPLICATIONS

| | | | |
|---|---|---|---|
| 817,009 | 7/1959 | Great Britain | 73/194 M |

Primary Examiner—Richard C. Queisser
Assistant Examiner—Stephen A. Kreitman
Attorney—Edwin E. Greigg

[57] ABSTRACT

An aircraft fuel management system providing accurate and comparable measurement and display of on-board fuel quantity, fuel rate and flight time remaining. This system utilizes capacitance method of fuel gaging and fuel mass flow rate derived from both volumetric flow measurement and capacitance density compensation. These separate measurements — fuel gaging and mass flow rate — are combined electronically to obtain "flight time remaining" under prevailing flight conditions.

2 Claims, 4 Drawing Figures

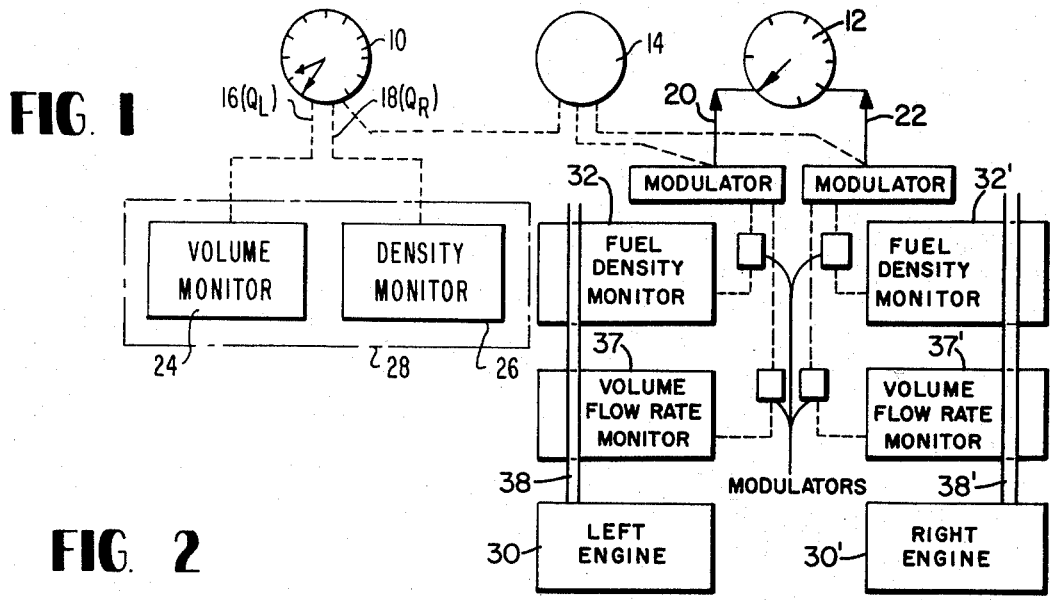
FIG. 1
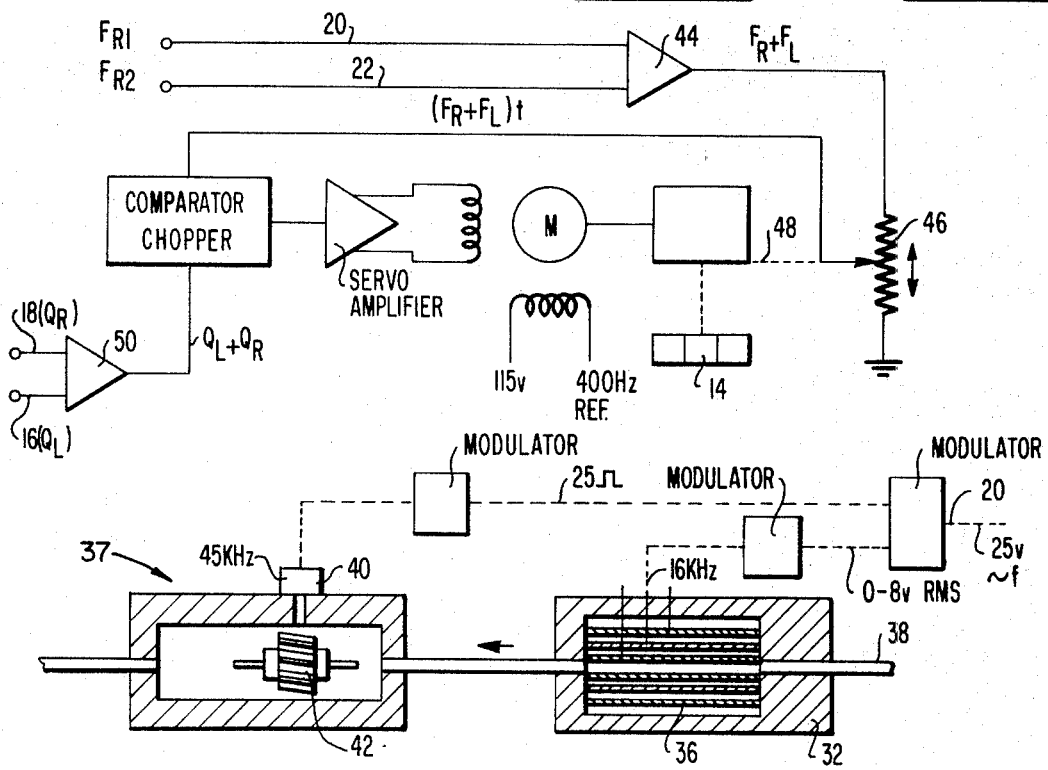
FIG. 2
FIG. 3
INVENTOR
DOUGLAS E. STUART
BY Edwin E. Greigg
ATTORNEY

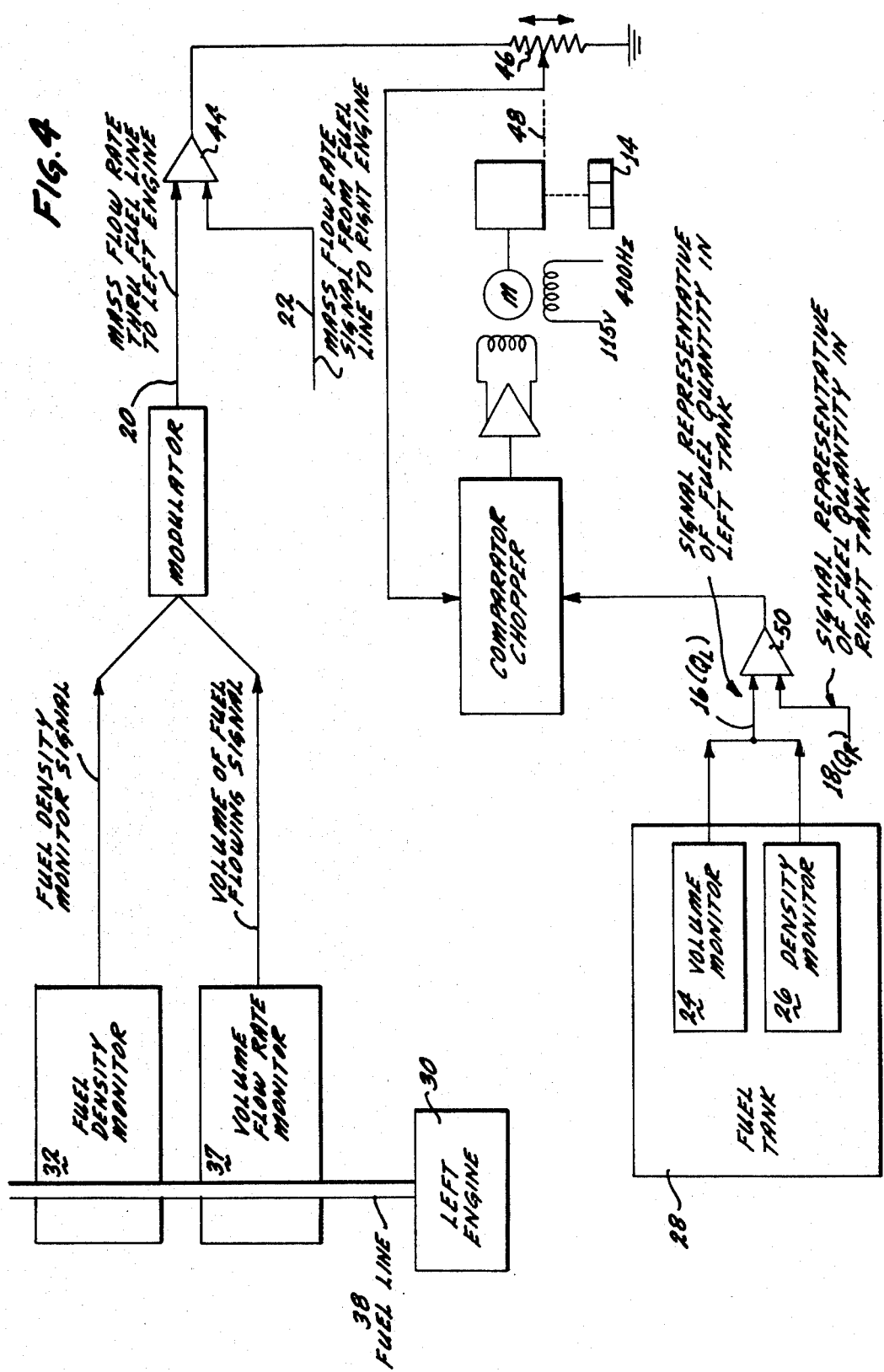

FUEL MANAGEMENT SYSTEM

BACKGROUND OF THE INVENTION

Accurate and comparable measurement and display of the fuel quantity on board, fuel consumption rate, and flight time remaining has represented a serious problem in the past. Fuel quantity and flow rate measurement were expressed in different units or the measurement differed because of variations in conditions at the points of measurements. These handicaps required the use of elaborate conversion and/or correction techniques to provide comparable information.

Too, previous attempts at presenting actual "flight time remaining" on board aircraft were dependent upon the accuracy of two different sub-systems usually made by separate manufacturers with errors resulting from one of the sub-systems measuring volume and not mass, and resulting from a sub-system not compensating for density changes or simply having temperature compensation. These errors very often were quite high.

The present system provides the information accurately and in comparable units by utilizing the capacitance method of fuel gaging and the fuel mass flow rate derived from both volumetric flow measurement and capacitance density compensation. These separate measurements are combined electronically to obtain "flight time remaining" under prevailing flight conditions.

Accordingly, an object of this invention is to provide accurate flight time remaining under prevailing flight conditions.

Another object of this invention is to provide a system of fuel management which provides the needed information accurately and in comparable units utilizing straight forward measurement principles.

Another object of this invention is to provide a capacitance method of fuel gaging and fuel mass flow rate derived from volumetric flow measurement and capacitance density combinations for accurate display of aircraft flight time remaining.

BRIEF DESCRIPTION OF THE DRAWINGS

FIG. 1 is a schematic diagram of the application of the invention showing the combination of the fuel quantity signals and rate signals to display flight time remaining;

FIG. 2 is a schematic diagram used herein to illustrate the devices operationally tied into the fuel time remaining gage; and FIG. 3 is a schematic illustration of the capacitance compensator flow meter in line with the fuel flow;

FIG. 4 is a schematic illustration of the overall system showing how the fuel line to a given engine is monitored as to its volume flow rate and as to its fuel density to provide a mass flow rate signal which is summed with the mass flow rate signal from any other engines; and FIG. 4 also shows how the fuel tank is monitored as to volume and density of fuel to give a signal representative of the fuel quantity in the left tank; and which signal is combined with signals representative of the quantity of fuel in any other tank; and how these signals are combined with a rebalancing system to indicate flight time remaining.

DESCRIPTION OF THE PREFERRED EMBODIMENT

Turning now to the drawings, fuel quantity gage 10 and fuel flow gage 12 are connected to the flight time remaining gage 14. Fuel quantity signals 16 and 18, displayed on the fuel quantity gage 10, and fuel flow signals 20 and 22 displayed on the fuel flow gage 12 are combined on the flight time remaining gage 14.

Quantity and density monitors 24 and 26, per se, do not form a part of this invention and therefore it will suffice only to summarily describe their operation. A detailed description can be had by reference to U. S. Pat. No. 2,981,105 issued to F. L. Ryder on Apr. 25, 1961 and U. S. Pat. No. 3,050,999 issued to H. F. Edwards on Aug. 28, 1962.

As described in the foregoing patents, the liquid quantity monitor 24 comprises a number of capacitance sensors or measuring probes immersed in a fuel tank 28. The probes are connected to a fixed, highly stable reference capacitor in a bridge arrangement with bridge nulling by a feedback potentiometer so that any change in the capacity of the immersed measuring probe due to the change in the fuel in the tank will be sensed and rebalanced continuously.

Tank 28 is shared with a density monitor 26, which also is a bridge circuit similar to the quantity monitor 24, to monitor changes in the fuel dielectric constant which is proportional to density.

With suitable transformers, high and low pass filters, the two monitors 24 and 26 may be frequency multiplexed.

The mass flow rate system shown in FIG. 1 is for two engines 30 and 30' connected to the fuel flow gage 12. The system comprises a monitor 32 and 32' and a turbine fuel flow meter 37 connected upstream of the engine 30.

The monitor 32 derives a signal representative of a fuel density and is obtained through a capacitance type capacitor which consists of tube capacitors 36 located in the fuel line 38 as shown in FIG. 3. The monitor 32 is similar to the monitor described in the fuel gage systems 24 and 26 in tank 28 and continually senses the capacitance value of the fuel in the fuel line so that variations in the fuel dielectric properties are always detected. The tube capacitors 36 like the capacitors of the fuel gage monitors 24 and 26, but located in the fuel line, are connected to a stable reference capacitor in a bridge arrangement with a bridge nulling being a feedback potentiometer so that any change in the capacity of the tube capacitors due to a change in the density of the fuel in the line 38 is sensed and rebalanced. Again, since this monitor 32 does not form a part of this invention, it will suffice only to summarily describe its operation; a detailed description of similar monitors of the type used in fuel gaging can be had by reference to the aforementioned patents; the differences being only that the capacitors are in the fuel line rather than in the tank.

The volume flow rate signal is obtained through a reluctance sensor probe 40 which senses the rotation speed of a turbine wheel 42 as shown schematically in FIG. 3 and responds quickly to flow variations and so located that the fuel flow causes the wheel to turn at a speed proportional to flow velocity. This rotation is sensed by the sensor located adjacent the turbine but outside the fuel environment.

In the embodiment shown, the volume flow rate signal obtained through the reluctance sensor 40 which senses rotation of the turbine wheel 42 modulates a 45 khz carrier signal applied to the sensor. The modulated carrier signal representing the volume flow rate is then processed through a signal modulator where it is demodulated and transferred into a 25 volt square wave whose frequency is representative of the volume flow rate. Use of the demodulated carrier principle eliminates magnetic drag and provides high amplitude pulses of a low flow condition which, in turn, assures high accurate measurement in the low flow range.

The signal representative of the fuel density obtained through the capacitance monitor 32 as aforesaid is similar to those currently used in the quantity gaging systems 24 and 26. This signal may have a 16 khz applied to the compensator which is processed through an amplifier into a demodulator to an 8 volt rms signal representing density variations.

As aforesaid, since it is very important to measure the flow of the fuel to the engines and since the density of the fuel both at the tank and at the engines is important otherwise an error as much as 15 percent will result, the two signals generated from the monitors in the tank and in the fuel lines may be combined to give a flight time remaining.

In FIG. 2 the operation of the flight time remaining gage 14 is based on the equation:

Time remaining $= t_R = (Q_L + Q_R)/(F_L + F_R)$ $(Q_L + Q_R) - (F_L + F_R)(t_R) = 0 =$ error signal, where $Q_L$ represents the quantity of fuel in the left tank, $Q_R$ represents the quantity of fuel in the right tank; $F_L$ represents the flow from the left tank; $F_R$ represents the flow from the right tank; and $t_R$ represents the time remaining. The sum of the two flow rate signals 20 and 22 (from the left engine and the right engine) from the density and volume monitors are summed through amplifier 44 and appear as a reference voltage on the rebalance potentiometer 46, the displacement potentiometer shaft 48 is geared directly to the time remaining counter 14. The rebalance signal is then $(F_L + F_R)(t_R)$ when compared to the signals $Q_L + Q_R$ combined through summing amplifier 50 to null the servo system thus solving the equation $Q_L + Q_R$.

As will be seen in FIG. 4, for example, the left engine 30 has a fuel line 38 which carries fuel to it. The fuel flowing in line 38 is monitored by the volume flow rate monitor 37 and the fuel density monitor 32. These elements have been previously described in connection with FIG. 3 wherein the turbine fuel flow monitor 37 is shown having a turbine wheel 42, a reluctance sensor probe 40 and a modulator which converts the volume flow rate into a square wave whose frequency is proportional to the volume flow rate. The fuel density monitor or capacitance monitor 32 was also shown in FIG. 3 wherein the fuel density is converted by a modulator to a voltage which is representative of the fuel density.

Again referring to FIG. 4, the fuel density monitor signal and the fuel volume signals are combined in another modulator to provide an output signal 20 which represents the total mass flow rate through the fuel line to the left engine 30. The signal 20 is fed to amplifier 44 where it is summed with a mass flow rate signal 22, for example, from the right engine. The mass flow rate from any other engine could also be inserted as a signal into summing amplifier 44 also. The summed outputs of amplifier 44 provide a voltage or potential which is placed across the potentiometer 46 and the voltage across the potentiometer 46 represents the total mass flow rate being fed to all of the engines of the airplane or other vehicle.

Concomitantly there is another system in operation. There is seen a fuel tank 28 which in this case represents the left fuel tank. Within this fuel tank is a fuel volume monitor 24 and a fuel density monitor 26 which operate according to the prior discussion aforementioned under FIG. 1. The signal outputs of 24 and 26 are combined to give a signal representative of the fuel quantity in the left tank, and designated at 16 ($Q_L$). This signal 16 is fed into an amplifier 50 which may also receive signals representative of fuel quantity in the right tank, which signal line may be designated as 18 ($Q_R$). Thus the signal output of the amplifier 50 represents the sum total of fuel quantity in all the tanks, at any given time.

The signal from amplifier 50 is fed into one side of a comparator chopper which has another input taken from the movable slider portion of the potentiometer 46, in a system which operates to cause a balancing action to take place so that the potential taken from the slider of potentiometer 46 becomes automatically matched to the signal output from amplifier 50. As this balancing action takes place through motor 18 which drives the link 48 to cause the slider of potentiometer 46 to pick off a signal potential equal to the signal potential of amplifier 50, the corrective motor action at the same time is used to turn an indicator 14 which indicates the quantity known as the "flight time remaining." Thus by measuring the sum total of the mass flow rate of fuel being consumed by one or all of the engines (as converted to an electronic signal across the potentiometer 46) as against the signal representative of fuel quantity in one or all of the fuel tanks, the equations, previously indicated in regard to eliciting the time remaining, are satisfied.

From the foregoing, it can be seen that there is disclosed a fuel management system improvement to today's aircraft operation. One simple display (shown digitally in FIG. 2) tells the pilot the length of time he can continue to fly at the prevailing throttle setting. This system is accurate, is economical because of the combination of the fuel flow rate and the fuel gaging systems combined relatively simply electronically, is safe since the accuracy of the entire system is enhanced and is reliable because of its simplicity of design.

That which is claimed is:

1. A system for measuring the flight time remaining for an aircraft having a fuel tank and at least one engine comprising:

monitoring means located in the fuel tank and capacitatively responsive to the dielectric of the fuel so as to generate a signal responsive to the volume of the fuel;

monitoring means located in the fuel tank and capacitatively responsive to the dielectric of the fuel in the tank to generate a signal responsive to the density of the fuel;

monitoring means located in the fuel line upstream of the engine and capacitatively responsive to the dielectric of the fuel so that a signal is generated responsive to the density of the fuel; and monitoring means in the fuel line upstream of the engine and responsive to the flow of fuel therethrough so as to generate a signal indicative of the volume of fuel flowing through the flow line and coupled to said density monitor so as to generate a signal indicative of the mass flow rate of fuel through said flow line; and a bridging network combining the output signals of all of the monitoring means and coupled to an indicator to generate the flight time remaining indication.

2. The system claimed in claim 1 further including means coupling said fuel tank monitoring means to generate a signal indicative of the fuel mass in the tank, and further including means coupling said fuel line monitoring means to generate a signal indicative of the rate of fuel mass consumption by the engine.

* * * * *